US009158857B2

(12) United States Patent
Preetham et al.

(10) Patent No.: US 9,158,857 B2
(45) Date of Patent: Oct. 13, 2015

(54) IDENTIFYING LANDING PAGES FOR IMAGES

(75) Inventors: Arcot J. Preetham, San Jose, CA (US); Randall G. Keller, Palo Alto, CA (US); Gabriel Wolosin, San Mateo, CA (US); Hyung-Jin Kim, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 494 days.

(21) Appl. No.: 13/488,572

(22) Filed: Jun. 5, 2012

(65) Prior Publication Data
US 2015/0161120 A1  Jun. 11, 2015

(51) Int. Cl.
*G06F 17/30* (2006.01)
*G06K 9/62* (2006.01)

(52) U.S. Cl.
CPC ...... *G06F 17/30899* (2013.01); *G06F 17/3028* (2013.01); *G06F 17/3089* (2013.01); *G06F 17/30244* (2013.01); *G06F 17/30247* (2013.01); *G06F 17/30864* (2013.01); *G06F 17/30867* (2013.01); *G06K 9/6215* (2013.01)

(58) Field of Classification Search
USPC ......................................................... 382/305
See application file for complete search history.

(56) References Cited

U.S. PATENT DOCUMENTS

| 6,671,407 | B1 * | 12/2003 | Venkatesan et al. .......... 382/232 |
| 7,298,931 | B2 | 11/2007 | Kim et al. |
| 7,460,735 | B1 | 12/2008 | Rowley et al. |
| 7,502,789 | B2 * | 3/2009 | Yao et al. .............................. 1/1 |
| 7,580,568 | B1 * | 8/2009 | Wang et al. .................... 382/173 |
| 8,019,746 | B2 * | 9/2011 | Liu ................................ 707/707 |
| 8,037,064 | B2 * | 10/2011 | Song et al. ..................... 707/726 |
| 8,131,715 | B1 * | 3/2012 | Page ............................... 707/723 |
| 8,166,027 | B2 * | 4/2012 | Giallanza ....................... 707/726 |
| 8,171,021 | B2 * | 5/2012 | Guha et al. ..................... 707/723 |
| 8,238,663 | B2 | 8/2012 | Kato |
| 8,595,240 | B1 * | 11/2013 | Otey et al. ..................... 707/749 |
| 8,626,585 | B1 * | 1/2014 | Mhatre ....................... 705/14.43 |
| 8,934,662 | B1 * | 1/2015 | Stewenius ..................... 382/100 |
| 2008/0130998 | A1 | 6/2008 | Maidment et al. |
| 2008/0313157 | A1 * | 12/2008 | Kim et al. ........................ 707/3 |
| 2009/0254553 | A1 * | 10/2009 | Weiskopf et al. ................. 707/6 |
| 2010/0036883 | A1 * | 2/2010 | Valencia-Campo et al. ........................... 707/104.1 |
| 2010/0281389 | A1 * | 11/2010 | Hutchinson ................... 715/736 |
| 2010/0303342 | A1 * | 12/2010 | Berg et al. ..................... 382/155 |

(Continued)

OTHER PUBLICATIONS

Baeza-Yates, Ricardo, et al. "Content-based image retrieval and characterization on specific web collections." Image and Video Retrieval. Springer Berlin Heidelberg, 2004. 189-198.*

(Continued)

*Primary Examiner* — Michelle Entezari
(74) *Attorney, Agent, or Firm* — Fish & Richardson P.C.

(57) ABSTRACT

Methods, systems, and apparatus for identifying landing pages for images. In one aspect, a method includes, for each image of a plurality of images, identifying web pages that each include the image, and, for each of the web pages, receiving a web score generated by a ranking algorithm. The web page having a web score indicating a highest importance relative to other web pages is selected, sets of similar images are determined from the images included in the selected web pages, and each set of similar images includes different images. For each set of similar images, an image is selected based on the selected web page that includes the selected image having a highest web score of the set, and the selected web page that includes the selected image is identified as a landing page for an image search result.

16 Claims, 7 Drawing Sheets

(56) References Cited

U.S. PATENT DOCUMENTS

| | | | | |
|---|---|---|---|---|
| 2010/0324993 | A1* | 12/2010 | Kacholia et al. | 705/14.54 |
| 2011/0047152 | A1* | 2/2011 | Smith, III | 707/723 |
| 2012/0233181 | A1* | 9/2012 | Shehata et al. | 707/748 |
| 2013/0046584 | A1* | 2/2013 | Yu et al. | 705/7.38 |
| 2013/0110865 | A1* | 5/2013 | Preetham et al. | 707/769 |
| 2013/0125047 | A1* | 5/2013 | Levin et al. | 715/790 |
| 2013/0132209 | A1* | 5/2013 | Belwadi et al. | 705/14.72 |
| 2013/0290404 | A1* | 10/2013 | Rajabi et al. | 709/203 |
| 2014/0136506 | A1* | 5/2014 | Ratner et al. | 707/706 |
| 2014/0169644 | A1* | 6/2014 | Dockhorn et al. | 382/118 |

OTHER PUBLICATIONS

Baratis, Evdoxios, Euripides GM Petrakis, and Evangelos Milios ("Automatic website summarization by image content: A case study with logo and trademark images." Knowledge and Data Engineering, IEEE Transactions on 20.9 (2008): 1195-1204.*

Takama, Yasufumi, and Noriaki Mitsuhashi. "Visual similarity comparison for Web page retrieval." Web Intelligence, 2005. Proceedings. The 2005 IEEE/WIC/ACM International Conference on. IEEE, 2005.*

Liu, Hao, et al. "Effective browsing of web image search results." Proceedings of the 6th ACM SIGMM international workshop on Multimedia information retrieval. ACM, 2004.*

Chen, Teh-Chung, Scott Dick, and James Miller. "Detecting visually similar Web pages: Application to phishing detection." ACM Transactions on Internet Technology (TOIT) 10.2 (2010): 5.*

Crandall, David J., et al. "Mapping the world's photos." Proceedings of the 18th international conference on World wide web. ACM, 2009.*

Zhou, Wengang, et al. "Latent visual context analysis for image reranking." Proceedings of the ACM International Conference on Image and Video Retrieval. ACM, 2010.*

Wang, Xin-Jing, et al. "Multi-model similarity propagation and its application for web image retrieval." Proceedings of the 12th annual ACM international conference on Multimedia. ACM, 2004.*

Kumar, Neeraj, Peter Belhumeur, and Shree Nayar. "FaceTracer: A search engine for large collections of images with faces." Computer Vision—ECCV 2008. Springer Berlin Heidelberg, 2008. 340-353.*

* cited by examiner

IDENTIFYING LANDING PAGES FOR IMAGES

BACKGROUND

This specification relates to selecting landing pages for images.

The Internet provides access to a wide variety of resources. For example, digital image files, video and/or audio files, as well as web pages for particular subjects or particular news articles, are accessible over the Internet. A variety of search engines are available for identifying particular resources accessible over the Internet. For example, digital images that satisfy a user's informational need can be identified by an image search process in which keywords or other data are processed to identify collections of digital images. Each image is identified to the user by an image search result. An image search result references a corresponding image resource that a search engine determines to be responsive to a search query, and typically includes a representative image of the image resource, such as a thumbnail. The image search result also references a page resource that includes the image resource.

SUMMARY

In general, one innovative aspect of the subject matter described in this specification can be embodied in methods that included the actions of, for each image of a plurality of images: identifying one or more web pages that each include the image; receiving, for each of the one or more web pages identified for the image, a web score generated by a ranking algorithm, the web score being a measure of importance of the web page relative to other web pages; selecting the web page having a web score indicating a highest importance relative to other web pages; determining, from the plurality of images included in the selected web pages, sets of similar images, each set of similar images including different images that are derived from a same source image; for each set of similar images: selecting, from the set of similar images, an image based on the selected web page that includes the selected image having a web score indicating a highest importance relative to other web pages that respectively include each of the other similar images of the set; and identifying the selected web page that includes the selected image as a landing page for an image search result that depicts an image from the set of similar images. Other embodiments of this aspect include corresponding systems, apparatus, and computer programs, configured to perform the actions of the methods, encoded on computer storage devices.

In general, another aspect of the subject matter described in this specification can be embodied in methods that include the actions of determining, from a plurality of images, sets of similar images, each set of similar images including different images that are derived from a same source image; for each set of similar images: identifying a set of web pages, each web page in the set of web pages including at least one of the similar images in the set of similar images, and wherein each of the similar images in the set of similar images is included in at least one of the web pages in the set of web pages; receiving, for each of the web pages included in the set of web pages, a web score generated by a ranking algorithm, the web score being a measure of importance of the web page relative to other web pages; identifying, from the set of web pages, a first web page based on the first web page having a web score indicating a highest importance relative to other web pages in the set of web pages; and identifying the first web page as a landing page for an image search result that depicts an image from the set of similar images. Other embodiments of this aspect include corresponding systems, apparatus, and computer programs, configured to perform the actions of the methods, encoded on computer storage devices Particular embodiments of the subject matter described in this specification can be implemented so as to realize one or more of the following advantages. A user who searches for images will be provided with image search results that each reference a respective landing page that is determined to be of the highest quality among pages that include the particular image referenced in the image search result. Quality may refer to any suitable metric for comparing landing pages, e.g., relative rank, relevance to a particular topic, and/or informative value. The selection of the higher quality landing page by the search engine increases the likelihood that the image is presented in a context that will satisfy the user's informational need.

In some implementations, additional signals such as the position of the image on the page and the numbers of images on the page can also be taken into consideration when determining which landing page to provide for a search result. Taking into account these additional signals could help the user find a particular image, and helps ensure that the users will be provided with the image in a particular context upon receipt of the landing page, which, in turn, also helps the user to determine whether the image in the context of the landing page satisfies the user's informational need.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

In response to selecting an image search result, a user device requests and receives a landing page referenced by the image search result. Often, an image or a visually similar image exists on multiple web pages. For each image, the methods and system described in this specification select the landing page of the highest quality among pages that include the particular image referenced in the image search result.

In some implementations, the system identifies a highest quality landing page from a set of pages that include the image and then finds the highest quality landing page from a set of pages that contain a visually similar image. To identify a highest quality landing page from a set of pages that include the image, the system identifies web pages that contain the same image. The pages are scored using a web search ranking algorithm, and the web page with the highest score is selected.

The images from the web pages that were selected based on the highest score are placed into sets of similar images. Each set of similar images includes images that are determined to be similar, e.g., near duplicate images that are usually created from the same source image by, but not limited to, cropping, resizing, minor color edits, etc. In some implementations, similar images include images that are not created from the same source image but meet a certain similarity threshold. For example, images of the same subject taken in quick succession might meet a similarity threshold for being considered similar. For each set of similar images, an image/landing page pair is selected based on which landing page has the highest score.

In another implementation, the system selects the highest quality landing page from a set of web pages that contains both duplicate images and similar images. For each image in a set of images, web pages that contain duplicate or similar images are scored using the web search ranking algorithm, and the web page with the highest score is selected as the landing page.

Example implementations are described in more detail in the sections that follow.

Example Environment

Figure 1:
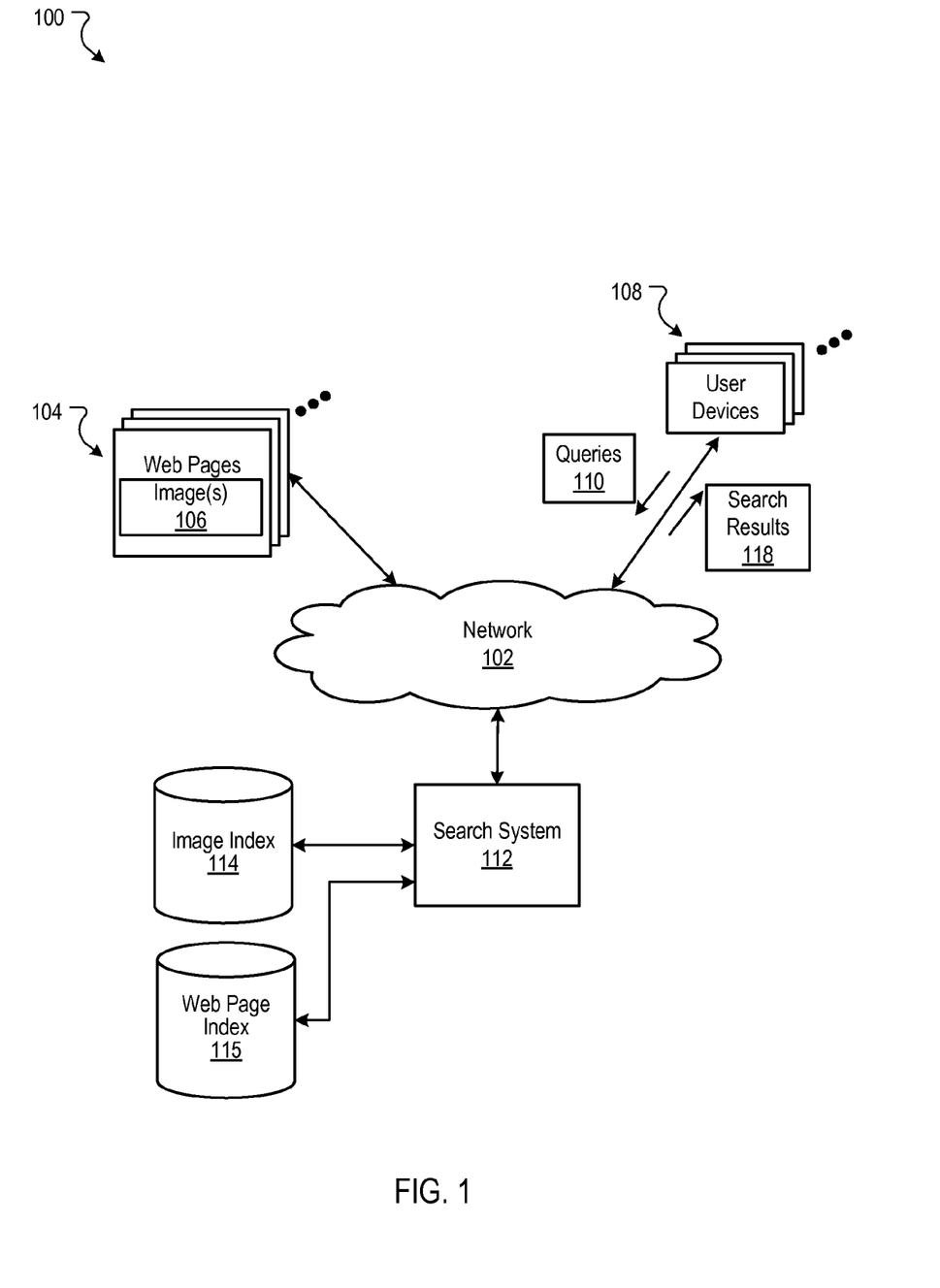
FIG. 1 is a block diagram of an example environment in which landing pages are selected for images.

FIG. 1 is a block diagram of an example environment 100 in which landing pages are selected for images 106. The example environment 100 includes a network 102, such as a local area network (LAN), a wide area network (WAN), the Internet, or a combination thereof. The example environment 100 also includes web pages 104 including images 106, user devices 108, an image search system 112, and an image index 114.

A web page 104 is a resource that can be provided over the network 102. A web page 104 is identified by a resource address that is associated with the web page 104. Web pages may be HTML pages, and may include a variety of content, such as words, phrases, images and sounds, that may include embedded information, such as meta-information in hyperlinks and/or embedded instructions, such as scripts.

A user device 108 is an electronic device that is under control of a user and is capable of requesting and receiving web pages 104 over the network 102. Example user devices 108 include personal computers, mobile communication devices, and other devices that can send and receive data over the network 102. A user device 108 typically includes a user application, such as a web browser, to facilitate the sending and receiving of data over the network 102.

To facilitate searching of resources, a search system 112 identifies the resources by crawling and indexing the resources. Data about the resources can be indexed based on the resource to which the data corresponds. For example, data describing image resources can be stored in an image index 114, and data describing web pages can be stored in a web page index 115. The indexes 114 and 115 can, in some implementations, be part of the same index data structure, or can be separate indexes.

User devices 108 can submit image search queries 110 to the image search system 112 over the network 102. In some implementations image search queries 110 may include text and/or images. In response, the image search system 112 accesses an image index 114 to identify image search results 118 that are relevant to the image search query 110. The image search system 112 identifies relevant images 106 in the form of image search results 118 and returns the image search results 118 to the user devices 108 in search results pages. An image search result 118 is data generated by the image search system 112 that identifies an image 106 that is responsive to a particular image search query 110, and typically includes a link to the image 106, or a link to a landing page, which is a web page 104 that includes the image 106 identified by the image search result 118. When a user interacts with an image search result 118, the user may be presented with the landing page corresponding to that image search result 118.

Often, the same image will appear on multiple web pages. There may also be near-duplicate images appearing on multiple web pages. Near duplicate images may be images that are derived from a same source image. For example, a particular image of the White House may be available on the official web page for the White House. A duplicate version of that image may also be available on other websites, e.g., news web sites, blogs, travel web sites, etc., and near-duplicate versions of that image may also be available on other websites. For example, a cropped version of the image, or a version of the image that has been scaled, may be included in another web page. Rather than referencing different landing pages for duplicate images and near-duplicate images across multiple image search results 118, the image search system 112 identifies a highest quality landing page for duplicate and near duplicate images, and provides one search result referencing the landing page.

Figure 2:
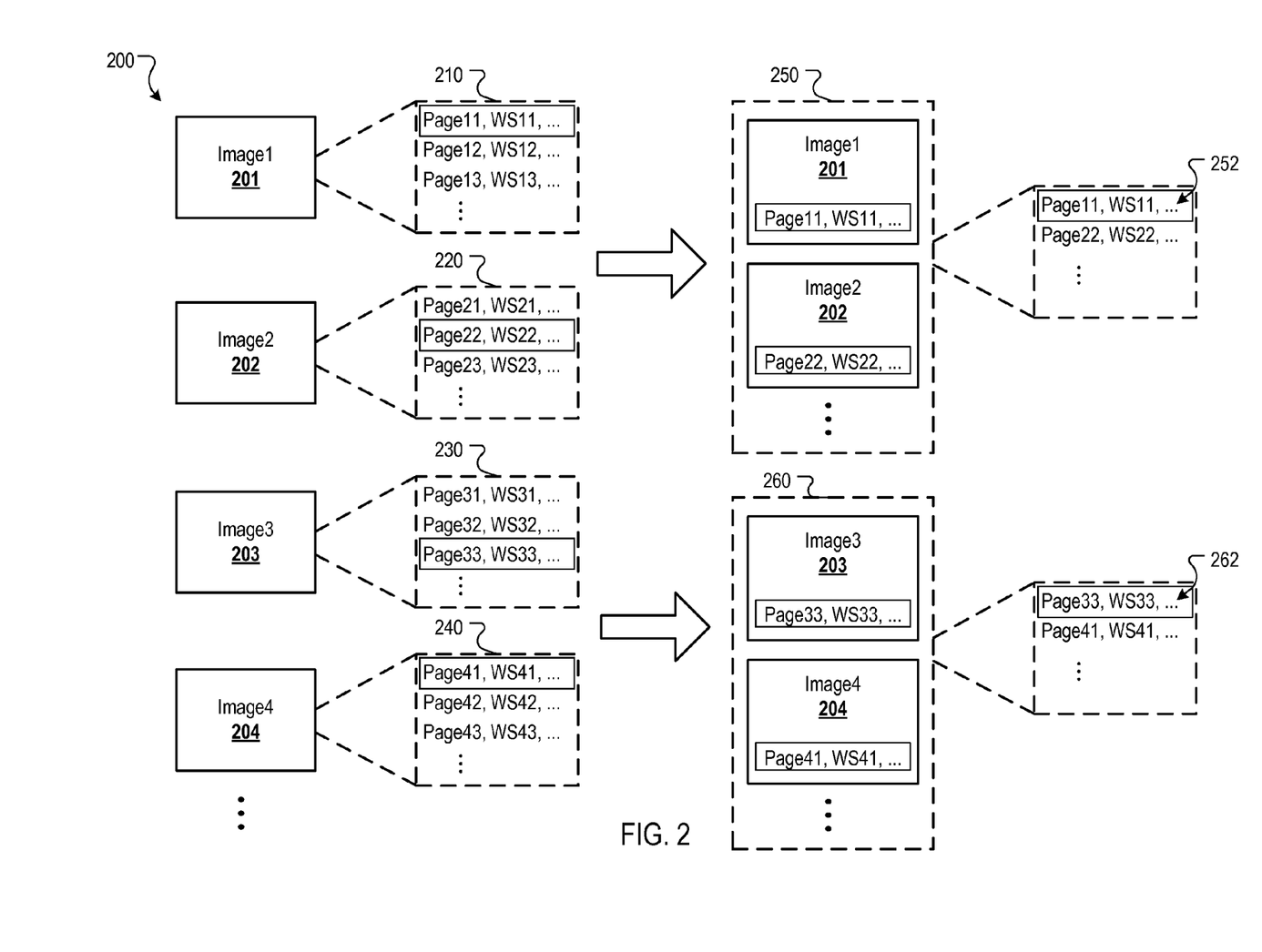
FIG. 2 is an illustration of an example data flow in which a first process is used to identify landing pages for images.

FIG. 2 is an illustration of an example data flow 200 in which a first process is used to identify landing pages for images. For each image in a group of images, one or more web pages are identified by the image search system 112 that each include the image. For example, the image search system 112 may identify a set 210 of web pages that each include Image1 201, such as web pages Page11, Page12, and Page13. Similarly, the image search system 112 may identify a set 220 of web pages that each include Image2 202 such as Page21, Page22, and Page23; a set 230 of web pages that each include Image3 203 such as Page31, Page32, and Page33; and a set 240 of web pages that each include Image4 204 such as Page41, Page42, and Page43.

For each of the web pages that include an image, a web score is received. The web score may be a relative rank of the web pages with respect to one another, or may be a normalized or static score. In some implementations, the web score is generated by a ranking algorithm and is a measure of importance of a web page relative to other web pages. For example, Page11 has a corresponding web score, WS11; Page12 has a corresponding web score, WS12; and Page13 has a corresponding web score, WS13. Each web score may be measured on a scale, for example, 1 to 100, where 1 indicates the lowest measure of importance and 100 indicates the highest level of importance, or a scale of importance using a range of 0.0 to 1.0; many suitable score scales exist for representing importance.

In some implementations, the web scores are based on a measure of relevance of the corresponding web page to a query. Thus, the web score for any given web page depends on a query. For example, an identical image of the Chicago skyline might be appear on two different web pages—one web page discussing the history of Chicago, and the second web page discussing entertainment and dining options in Chicago. For the query, "Chicago history," both web pages may be relevant, but the first web page is likely more relevant—and likely has a higher web score—than the second web page. On the other hand, for the query, "Chicago restaurants," both web pages may still be relevant, but the first web page is likely less relevant—and likely has a lower web score—than the second web page.

In some implementations, each web score may be based on one or more web page features. For example, any of the following features, alone or in combination, could affect the web score for a particular web page: the size of an image, e.g., dimensions or surface area; the aspect ratio of an image, e.g., relative horizontal and vertical size; the position of the image on the web page, e.g., top or bottom of a web page; the number of images on the web page; or the textual content of the web page, e.g., is the web page discussing images or the content depicted in images. Accordingly, the web score for a web page may be increased if the particular image was large, placed near the top of the web page, and if the text of the web page discussed the image.

For each image, the highest scoring web page that includes the image is selected. For example, if the set 210 of web pages and corresponding web scores, on a scale from 0.0 to 1.0, for Image1 is as follows: [Page11, 0.95; Page12, 0.43; Page13, 0.79 . . . ], Page11 may be selected because it has the highest web score (0.95) relative to the other web pages in the set 210. In the example data flow 200, Page22 is selected as the highest scoring web page for Image2 202, Page33 is selected as the highest scoring web page for Image3 203, and Page41 is selected as the highest scoring web page for Image4 204.

From the images that are included in the selected web pages, sets of similar images are determined. For example, a first set 250 of similar images includes Image1 201 and Image2 202, indicating that Image1 is similar to Image2. A second set 260 of similar images includes Image3 203 and Image4 204, indicating that Image 3 is similar to Image 4. In some implementations, similar images are images that are derived from the same source image. For example, if a source image is cropped, resized, scaled, recolored, filtered and/or altered in any way, the resulting images would all be derived from the same source image, and each image that is derived from the same source image, including the source image, may be deemed similar to all other images derived from the same source image.

From each set of similar images, an image is selected based on the web page that includes the image having a web score that is higher than the web score of any other web pages corresponding to images in the set of similar images. For example, if WS11 is the highest web score from the first set 250 of similar images, Image1 201 would be selected for the first set 250. If WS33 is the highest web score from the second set 260 of similar images, Image3 203 would be selected for the second set 260.

For each set of similar images, the selected web page that includes the selected image is identified as a landing page for an image search result that depicts an image from the set of similar images. For example, Page 11 is identified as the landing page 252 for the first set 250 of similar images due to its score, WS11, being greater than the scores of all other web pages corresponding to the images included in the first set 250 of similar images. Similarly, Page33 is identified as the landing page 262 for the second set 260 of similar images due to its score, WS33, being greater than the scores of all other web pages corresponding to the images included in the second set 260 of similar images. Accordingly, when any image from the first set 250 of similar images is depicted in an image search result, Page11 will be the landing page for that image search result.

In some implementations, a user may be provided with the option to view multiple search results depicting duplicate and/or similar images. For example, if a user elects to view search results for each image in a set of duplicate or similar images, e.g., by clicking on a hyperlink stating "click here for similar image search results," the user may be provided with search results corresponding to the set of similar images, or the set of similar images. Each search result may depict its corresponding image, and link to its corresponding landing page, as opposed to the highest quality landing page of a set to which it belongs.

In some implementations, data identifying the landing page for an image search result is stored in a data storage apparatus. For example, the image index 114 may include a data field for each image, the data field indicating a landing page for an image search result that displays that image. Accordingly, the data field for each image in the first set 250 of similar images would indicate Page11 as the landing page for an image search result that displays that image.

Figure 3:
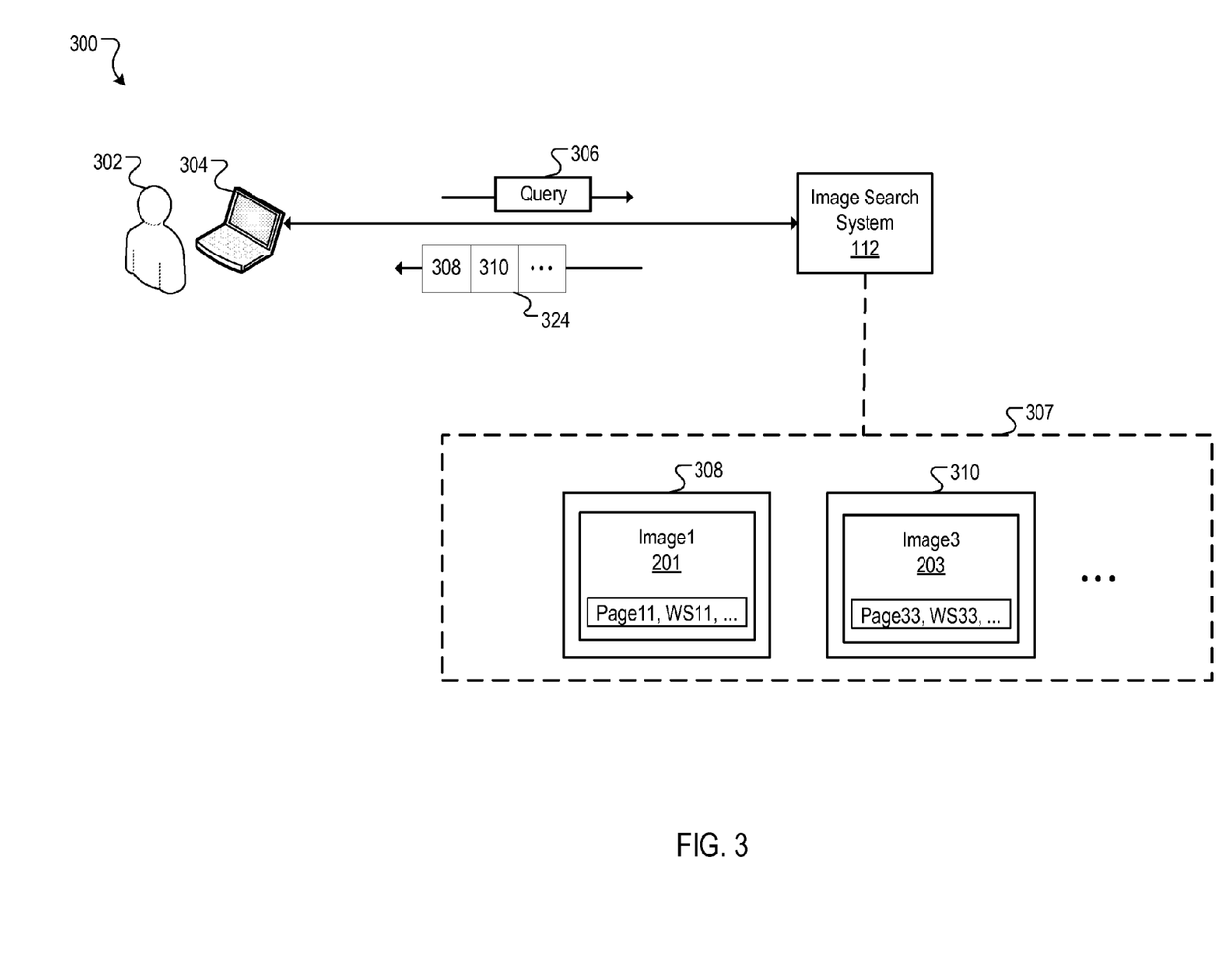
FIG. 3 is an illustration of an example data flow in which data that causes display of image search results is provided to a user.

FIG. 3 is an illustration of an example data flow 300 in which data 324 that causes display of image search results is provided to a user 302. In FIG. 3, each image search result references an underlying page determined from the data flow 200 of FIG. 2.

The image search system 112 receives an image query 306, and image search results 307 are obtained. Each image search result references an image that is responsive to the image query 306, and also a selected landing page. For example, the image search result 308 references image 201, for which the landing page Page11 was selected. Likewise, the image search result 310 references the image 203, for which the landing page Page33 was selected, and so on. As a result, the landing pages of the image search results 307 are the landing pages selected form the groups of similar images.

Data 324 that causes display of image search results is provided to a user device 304. In general, the data 324 provided to the user device 304 causes the image search results to be displayed to the user 302, e.g., using an image search results page viewed using a web browser of the user device. User 302 selection of a particular image search result causes display of the landing page that corresponds to that selected image search result. For example, if a user 302 clicks on image search result 310, depicting Image2, the user device may navigate to the landing page 318, Page11.

Actual display of the image search results is left to the user device 304, controlled in part by the image search system 112. For example, the image search system 112 may limit the number of image search results displayed per image search result web page, and the user device 304 may limit the size of the image search results that are displayed to the user. The order in which the image search results are displayed is generally left to the image search system. Often, the image search results will be ranked according to a measure of importance relative other image search results and/or ranked according to a measure of importance relative to the image search query. For example, the image search results may be ranked according to the web scores of their corresponding landing pages.

Figure 4:
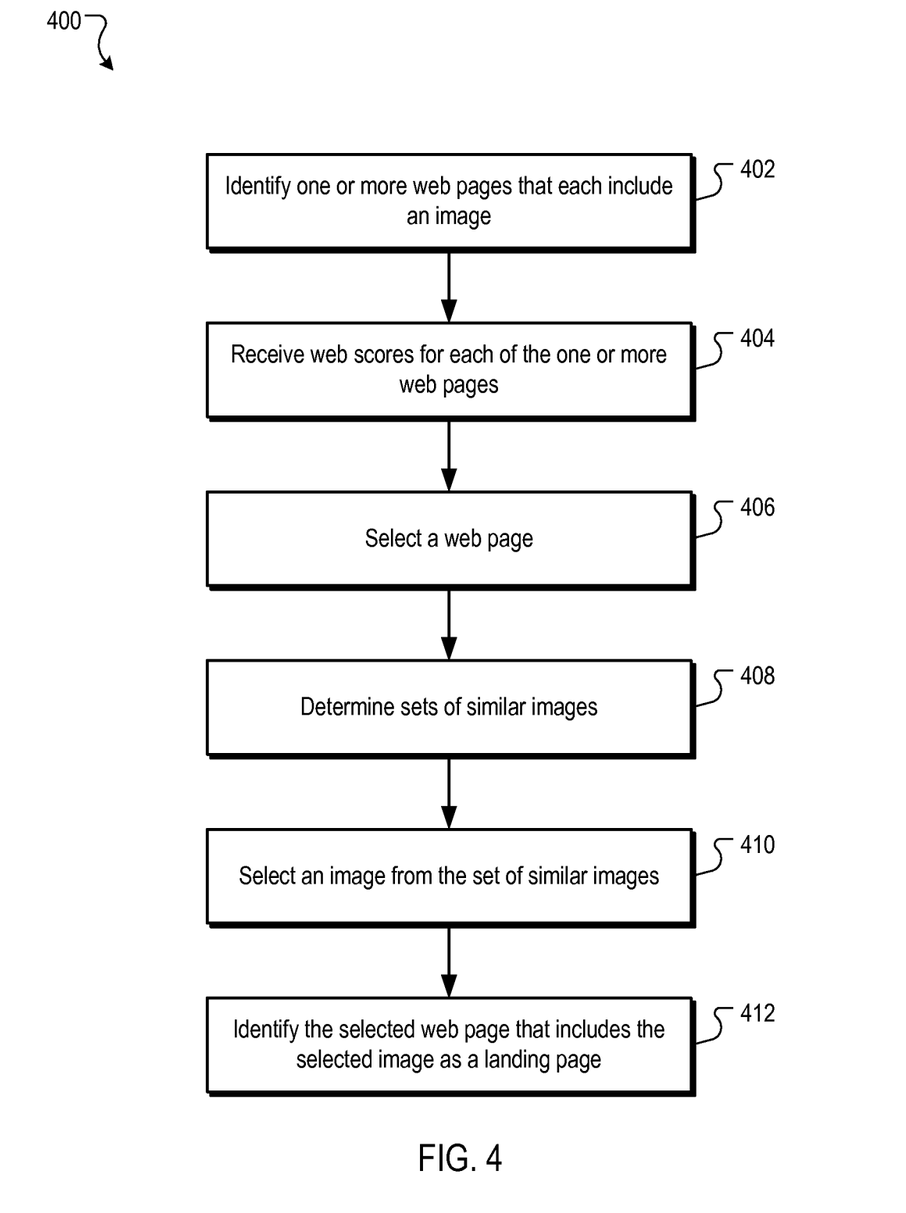
FIG. 4 is a flow diagram of the example first process for identifying landing pages for images.

FIG. 4 is a flow diagram of the example first process 400 for identifying landing pages for images. The process may be used by a data processing apparatus to realize the image search system 112.

For each of a group of images, one or more web pages that each include the image are identified (402). For example, a particular image of the White House may be displayed on multiple web pages. The image may appear on the official web page of the White House, a news web page that contains a news article about the White house, and an encyclopedia web page discussing the history of the White House.

For each of the group of images, a web score for each of the one or more web page is received (404). In some implementations, each web score is a query independent measure of importance of a web page relative to other web pages. In some implementations, each received web score is a measure of importance of a web page relative to a query.

For each of the group of images, a web page is selected (406). In some implementations, the web page having a web score that indicates a highest importance relative to other web pages is selected. For example, if there are ten web pages that each include the same image, the web page with the highest web score may be selected.

Sets of similar images are determined (408). In some implementations, sets of similar images are determined from the group of images included in the selected web pages. For example, if there are ten selected web pages, the images depicted on those web pages may be organized into sets of images that are similar to one another. In some implementations, each set of similar images includes different images that are derived from a same source image. For example, images may be similar to one another if they are each altered versions of the same source image, or if one is the source image. Thus, a set of similar images would include a source image, a cropped version of that image, a resized or scaled version of that image, versions of the image with color adjustments, and any other alterations or combination of alterations of the source image.

For each set of similar images, an image from the set of similar images is selected (410). In some implementations, the image is selected based on the web page that includes that image having a web score indicating a highest importance relative to other web pages that respectively include each of the other similar images of the set. For example, if there are five images in a set of similar images, the image whose web page has the highest web score may be selected.

For each set of similar images, a selected web page that includes the selected image is identified as a landing page for an image search result that depicts an image from the set of similar images (412). For example, if there are five images in a set of similar images, the landing page for image search results that depict any of the images in that set will be the same—the landing page will be the web page that includes the selected image, e.g., the web page with the highest web score. In some implementations, data identifying the landing pages for each image search result is stored in a data storage apparatus.

Figure 5:
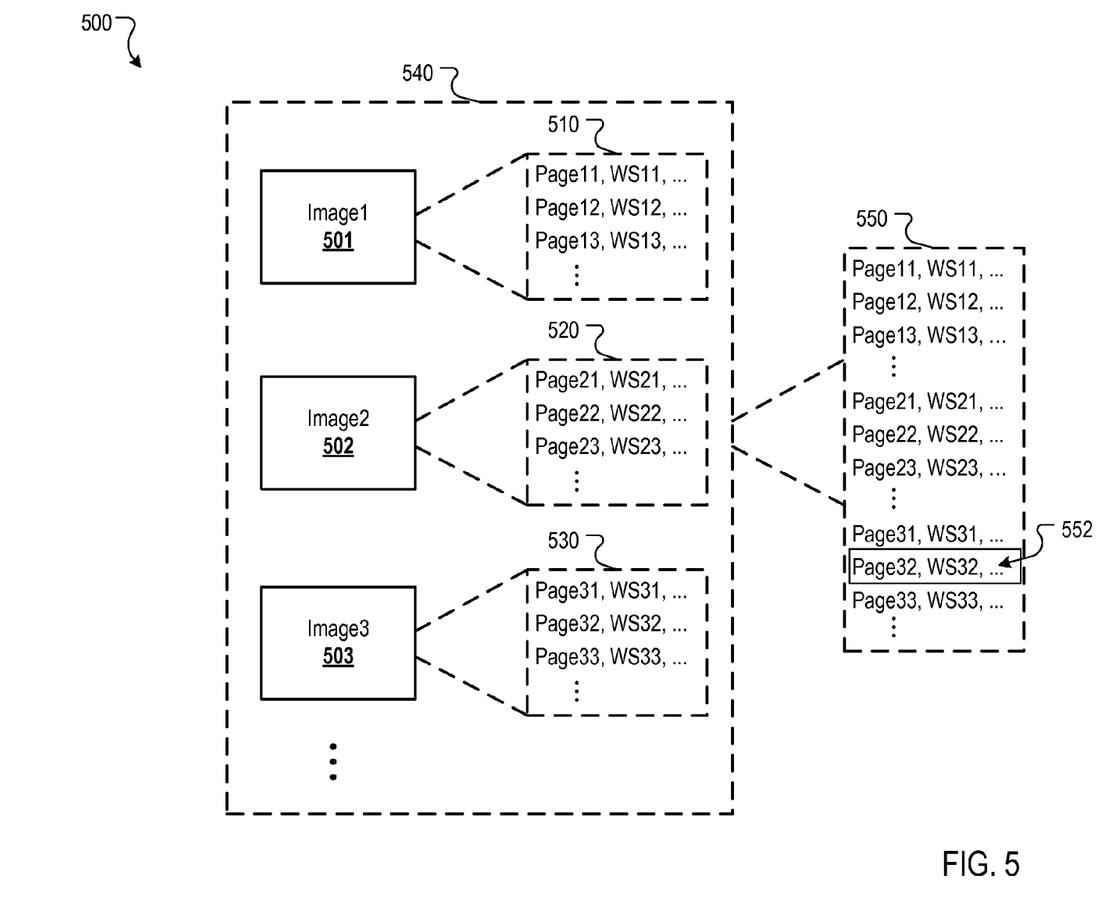
FIG. 5 is an illustration of an example data flow in which a second process is used to identify landing pages for images.

In FIG. 2, the process 200 first identified web pages for identical image, and then identified web pages from sets of similar images referenced by the highest quality web pages. However, in some implementations, the image can first be grouped into a set of similar images, and the highest quality web page can then be selected. This process is illustrated with reference to FIGS. 5 and 6. In particular FIG. 5 illustrates an example data flow 500 in which a second process is used to identify landing pages for images. A set of similar images 540 is determined from a group of images. In some implementations, images are similar to one another if they are derived from the same source image. The image search system may identify Image1 501, Image2 502, and Image3 503 as similar images. For example, all three images may be derived from a picture of the Eiffel Tower. Image1 may be an image of the Eiffel Tower, Image2 may be a black and white version of Image1, and Image3 may be a cropped version of Image1.

Because each image is derived from the same source image, e.g., Image1, they are all identified as belonging to the same set of similar images 540.

A set of web pages 550 is identified for each set of similar images 540. In some implementations, each web page in the set of web pages 550 includes at least one of the similar images in the set of images, and each image in the set of similar images 540 is included in at least one of the web pages in the set of web pages 550.

A web score is received for each web page in the set of web pages 550. In some implementations, each web score is generated by a ranking algorithm and is a measure of importance of a web page relative to other web pages. For example, Page11 has a corresponding web score, WS11; Page12 has a corresponding web score, WS12; Page13 has a corresponding web score, WS13, and so on. In some implementations, web scores are relative to all web pages, and, in some implementations, web scores indicate importance or relevance to a query.

A web page 552 from the set of web pages 550 is identified based on its web score indicating a highest importance relative to other web pages in the set of web pages 550. For example, WS32—the web score associated with web page Page32—may be higher than all other web scores in the set of web pages 550, which results in Page32 being identified as the highest scoring web page in the set of web pages 550.

The highest scoring web page is identified as a landing page for image search results that depict an image from the set of similar images 550. In some implementations, the landing page for set of image search results is stored in a data storage apparatus, such as the image index. The landing page may indicate which web page a user will be directed to upon interacting with a particular image search result. For example, if a user clicks on an image search result that depicts Image1 501, the user's web browser may be directed to Page32—the landing page for the set of similar images to which Image1 501 belongs. In another implementation, an image search result that depicts Image3 503 supplants search results that depict other images from the set of similar images 550, and clicking on the image search result that depicts Image3 503 may direct the user's web browser to Page32.

Figure 6:
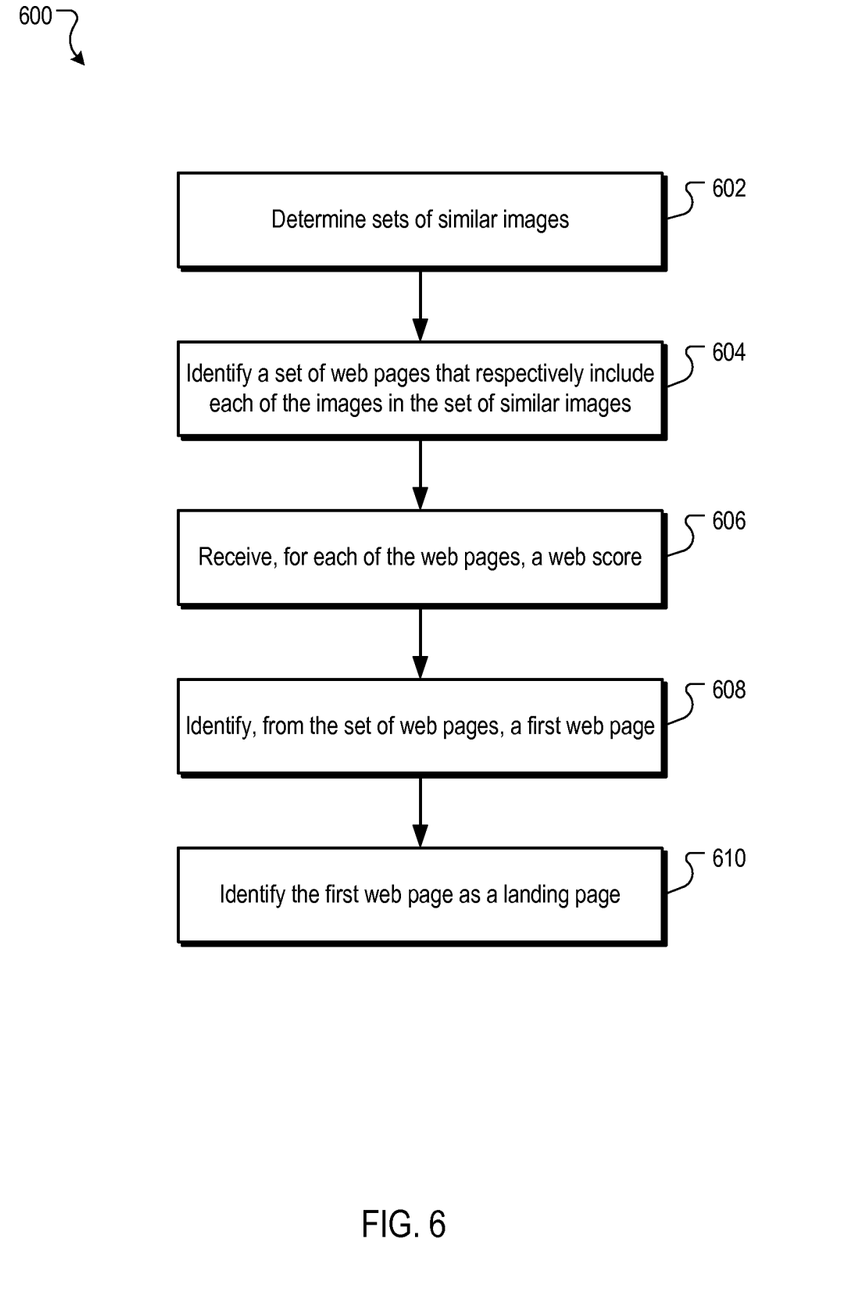
FIG. 6 is a flow diagram of the example second process for identifying landing pages for images.

FIG. 6 is a flow diagram of the example second process 600 for identifying landing pages for images. The process may be used by a data processing apparatus to realize the image search system 112.

Sets of similar images are determined from a group of images (602). In some implementations, each set of similar images includes different images that are derived from a same source image.

For each set of similar images, a set of web pages is identified (604). In some implementations, each web page in the set of web pages includes at least one of the similar images from the set of similar images.

For each web page in the set of web pages, a web score is received (606). In some implementations, the web score is generated by a ranking algorithm, and is a measure of importance of the web page relative to other web pages. In some implementations, web scores are relative to all web pages, and, in some implementations, web scores indicate importance or relevance to a query.

From the set of web pages, a web page is identified (608). In some implementations, the web page is identified based on its web score indicating a highest importance relative to other web pages in the set of web pages.

The web page with the highest web score is identified as a landing page for an image search result that depicts an image from the set of similar images (610). In some implementations, the landing page for set of image search results is stored in a data storage apparatus, such as the image index.

Figure 7:
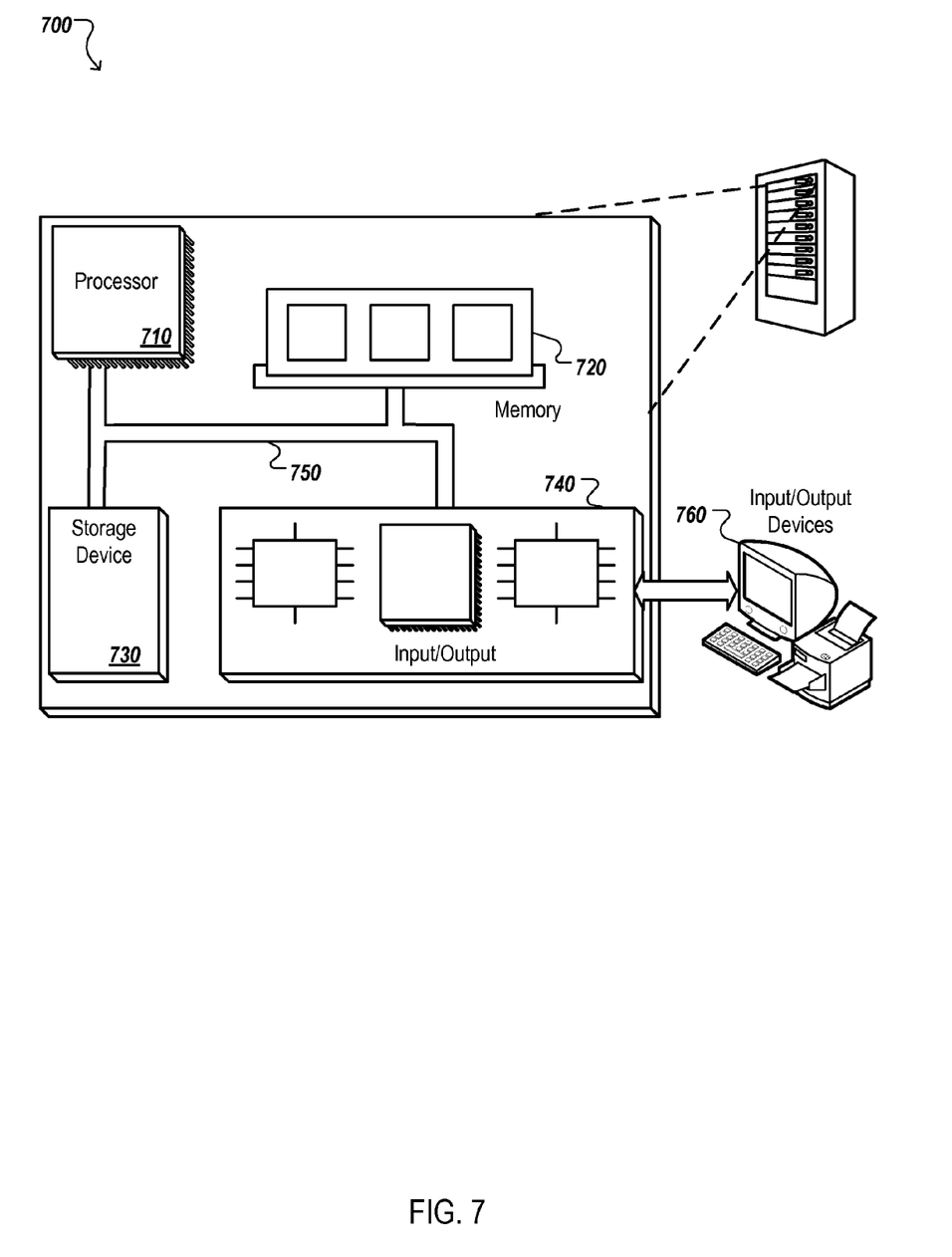
FIG. 7 is a block diagram of an example data processing apparatus.

FIG. 7 is a block diagram of an example data processing apparatus 700 that can be used to perform operations described above. The apparatus 700 includes a processor 710, a memory 720, a storage device 730, and an input/output device 740. Each of the components 710, 720, 730, and 740 can be interconnected, for example, using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730. The memory 720 stores information within the apparatus 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the apparatus 700. In one implementation, the storage device 730 is a computer-readable medium. In various different implementations, the storage device 730 can include, for example, a hard disk device, an optical disk device, a storage device that is shared over a network by multiple computing devices, e.g., a cloud storage device, or some other large capacity storage device.

The input/output device 740 provides input/output operations for the apparatus 700. In one implementation, the input/output device 740 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 760. Other implementations, however, can also be used, such as mobile computing devices, mobile communication devices, set-top box television client devices, etc.

Although an example data processing apparatus has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, comprising:
   for each image of a plurality of images:
      identifying web pages that each include the image;
      receiving, for each of the web pages identified for the image, a web score generated by a ranking algorithm, the web score being a measure of importance of the web page relative to other web pages;
      selecting the web page having a web score indicating a highest importance relative to other web pages;
   determining, from each image for which a selected webpage was identified, sets of similar images from only the images for which selected webpages were identified, each set of similar images including different images that are derived from a same source image;
   for each set of similar images:
      selecting, from the set of similar images, a landing page for an image search result that depicts an image from the set of similar images, the landing page being the selected web page that includes an image from the set of similar images and has a web score indicating a highest importance relative to other web pages that respectively include each of the other similar images of the set.

2. The method of claim 1, further comprising storing, in a data storage apparatus, data identifying the landing page for an image search result.

3. The method of claim 1, further comprising:
   receiving an image query;
   obtaining a plurality of image search results that are responsive to the image query, each image search result depicting one of the plurality of images;
   providing data that causes display of the image search results, wherein selection of a particular image search result causes display of the landing page that corresponds to the particular image search result.

4. The method of claim 1, wherein:
the web scores that are received for the web pages are based, at least in part, on a measure of relevance of the web page to a query; and
identifying the selected web page that includes the selected image as the landing page for an image search result further comprises identifying the selected web page as the landing page for an image search result for the query.

5. The method of claim 1, wherein each web page that includes an image from the set of similar images is associated with one or more web page features, and wherein selecting a landing page is further based on the one or more web page features.

6. The method of claim 5, wherein the one or more web page features include an image size of an image from the set of similar images that is included in the web page.

7. The method of claim 5, wherein the one or more web page features include an image aspect ratio of an image from the set of similar images that is included in the web page.

8. The method of claim 5, wherein the one or more web page features include a position on the web page of an image from the set of similar images.

9. The method of claim 5, wherein the one or more web page features include a number of images on the web page.

10. The method of claim 5, wherein the one or more web page features include a textual content of the web page.

11. A system comprising:
a data processing apparatus; and
a data store storing instructions that, upon execution, cause the data processing apparatus to perform operations comprising:
for each image of a plurality of images:
identifying web pages that each include the image;
receiving, for each of the web pages identified for the image, a web score generated by a ranking algorithm, the web score being a measure of importance of the web page relative to other web pages;
selecting the web page having a web score indicating a highest importance relative to other web pages;
determining, from each image for which a selected webpage was identified, sets of similar images from only the images for which selected webpages were identified, each set of similar images including different images that are derived from a same source image;
for each set of similar images:
selecting, from the set of similar images, a landing page for an image search result that depicts an image from the set of similar images, the landing page being the selected web page that includes an image from the set of similar images and has a web score indicating a highest importance relative to other web pages that respectively include each of the other similar images of the set.

12. The system of claim 11, wherein the operations further comprise:
receiving an image query;
obtaining a plurality of image search results that are responsive to the image query, each image search result depicting one of the plurality of images;
providing data that causes display of the image search results, wherein selection of a particular image search result causes display of the landing page that corresponds to the particular image search result.

13. The system of claim 11, wherein:
the web scores that are received for the web pages are based, at least in part, on a measure of relevance of the web page to a query; and
identifying the selected web page that includes the selected image as the landing page for an image search result further comprises identifying the selected web page as the landing page for an image search result for the query.

14. A non-transitory computer readable medium encoded with instructions that, when executed by a data processing apparatus, cause the data processing apparatus to perform operations comprising:
for each image of a plurality of images:
identifying web pages that each include the image;
receiving, for each of the web pages identified for the image, a web score generated by a ranking algorithm, the web score being a measure of importance of the web page relative to other web pages;
selecting the web page having a web score indicating a highest importance relative to other web pages;
determining, from each image for which a selected webpage was identified, sets of similar images from only the images for which selected webpages were identified, each set of similar images including different images that are derived from a same source image;
for each set of similar images:
selecting, from the set of similar images, a landing page for an image search result that depicts an image from the set of similar images, the landing page being the selected web page that includes an image from the set of similar images and has a web score indicating a highest importance relative to other web pages that respectively include each of the other similar images of the set.

15. The computer readable medium of claim 14, wherein the operations further comprise:
receiving an image query;
obtaining a plurality of image search results that are responsive to the image query, each image search result depicting one of the plurality of images;
providing data that causes display of the image search results, wherein selection of a particular image search result causes display of the landing page that corresponds to the particular image search result.

16. The computer readable medium of claim 14, wherein:
the web scores that are received for the web pages are based, at least in part, on a measure of relevance of the web page to a query; and
identifying the selected web page that includes the selected image as the landing page for an image search result further comprises identifying the selected web page as the landing page for an image search result for the query.

* * * * *